Figure 1:
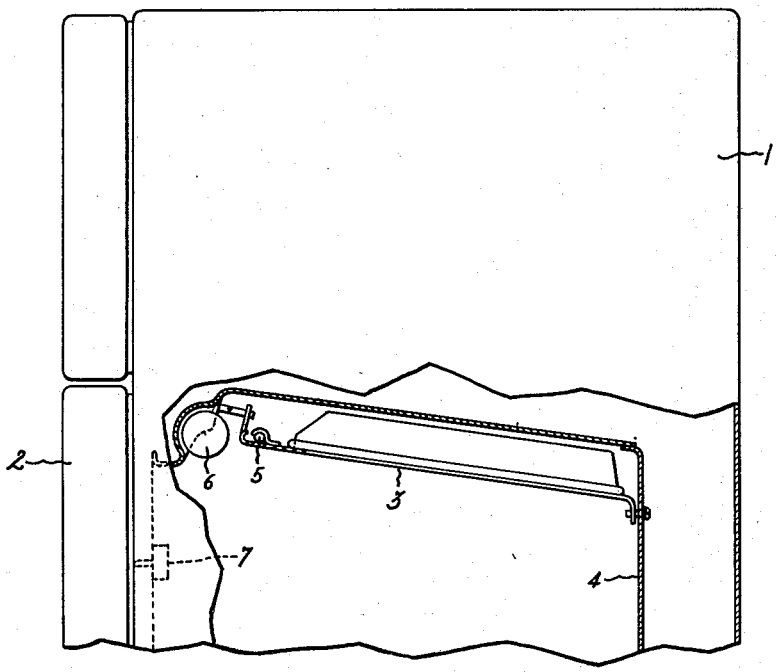

July 7, 1953  F. A. SCHUMACHER ET AL  2,644,314
COMPENSATED CONTROL SYSTEM
Filed March 30, 1951

Inventors:
Frank A. Schumacher,
John B. Tucker,
by William B. Edwards, Jr.
Their Attorney.

Patented July 7, 1953

2,644,314

UNITED STATES PATENT OFFICE 2,644,314

COMPENSATED CONTROL SYSTEM

Frank A. Schumacher, Erie, Pa., and John B. Tucker, Marblehead, Mass., assignors to General Electric Company, a corporation of New York Application March 30, 1951, Serial No. 218,376

4 Claims. (Cl. 62—4)

Our invention relates in general to refrigerator temperature and illumination control systems and in particular to such systems arranged to minimize temperature fluctuation.

In conventional household refrigerators the temperature of the air and objects in the refrigerated compartment is controlled by a temperature-sensitive electrical switch which in turn controls an electric motor driving a motor-compressor unit. The temperature-sensitive switch usually includes movable contacts mounted upon an expansible bellows, the interior of which is connected by suitable tubing to a temperature-sensing control bulb located within the refrigerated compartment. The bellows, tubing, and control bulb are filled with a thermally expansible fluid so that when the temperature of the refrigerated compartment and the temperature of the fluid in the control bulb rise to a predetermined value, the expansion of the fluid and the bellows effects closing of the motor-controlling switch. Conversely, when the refrigeration compressor unit reduces the temperature of the refrigerated compartment and the control bulb below a predetermined value, the motor-controlling switch is opened and the unit stopped.

It is also common practice to provide in a conventional refrigerator a source of illumination, namely, an electric lamp, to illuminate the refrigerated compartment. The lamp is controlled by a door-actuated switch so that it is turned on when the compartment door is open and turned off when the compartment door is closed.

One of the problems encountered in the design and construction of a refrigerator temperature control system results from the fact that time delays of heat transfer make the temperature of the refrigerated compartment at points remote from the temperature-sensing bulb lag or lead the temperature actually sensed by the bulb. In particular, for refrigerators wherein the sensing bulb is located on or near the evaporator (the generally preferred location) and is therefore responsive to evaporator temperature, an addition of heat to the compartment at a point remote from the evaporator does not cause the compressor motor to be started until some of the heat is transferred to and warms the sensing bulb sufficiently. The temperature of the air and objects in the compartment rises appreciably and is only reduced to the original value after the compressor motor has started and the added heat has been removed by the evaporator. A desired action of the temperature control system is that it causes the compressor motor to start immediately upon such an addition of heat, thus causing the evaporator to remove the added heat before the air and objects in the compartment rise appreciably in temperature. Fluctuations in the temperature of the refrigerated objects would thus be held to a minimum.

Each time that the door of a refrigerated compartment is momentarily opened, a considerable amount of warm air enters the refrigerated compartment and also heat is generated by the energized electric lamp. However, due to the lagging effect inherent in the temperature control system, the heat so introduced into the compartment does not cause the temperature-sensitive switch to start the compressor unit motor until the heat has spread to all parts of the refrigerated compartment and warmed the temperature control bulb to a predetermined temperature. Thus, with frequent openings and closings of the door, the temperature of the objects in the refrigerator compartment fluctuates considerably.

It is an object of our invention to provide in combination an improved illumination control and temperature control system for refrigerators.

It is another object of our invention to provide, in combination, an illumination and temperature control system for a refrigerator which minimizes fluctuation of the temperature of objects therein due to momentary openings of the refrigerator door.

In carrying out the objects of our invention, in one form thereof, we provide an electrical switch, responsive to the temperature sensed by temperature-sensing element located in the refrigerated compartment of a refrigerator, to start and stop an electric motor which drives the compressor of the refrigerator. We further provide a source of illumination, i. e., an electric lamp, for illuminating the refrigerated compartment, the lamp being controlled by a door-actuated switch which turns the lamp on when the compartment door is opened and turns the lamp off when the door is closed. The temperature-sensing element and the electric lamp are mounted immediately adjacent each other within the refrigerated compartment so that when the compartment door is opened and the lamp illuminates the compartment, the heat generated by the energized lamp warms the sensing means causing the compressor motor to be started substantially immediately after the door is opened and before the contents of the refrigerated compartment rise appreciably in temperature. Thus, the illumination and temperature control system of our invention not only operates to illuminate and control the temperature of the refrigerated compartment but also to cause heat entering the compartment, and generated in the compartment by the illuminating lamp, during the momentary opening of the door to be removed by the refrigeration unit before such heat can cause an appreciable rise in the overall temperature of the compartment and its contents.

Figure 2:
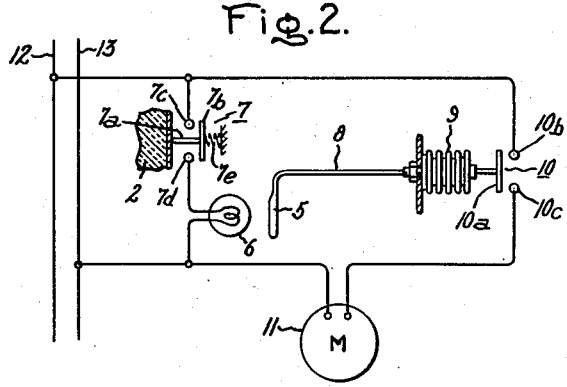

For a better understanding of our invention, together with further objects and advantages thereof, reference should be had to the following description together with the accompanying drawing in which Fig. 1 is a side elevation view, partly broken away, of a part of a refrigerator cabinet, and Fig. 2 is a schematic diagram of a preferred circuit embodying the illumination and temperature control system of our invention.

Referring now to the drawing, there is partially shown in Fig. 1 a refrigerator cabinet 1, having a door 2, partially broken away to show the interior of the refrigerated compartment and an evaporator 3 supported therein on an inner liner 4. Temperature-sensing means, such as a temperature-sensing control bulb 5, is mounted in the compartment, preferably on or near evaporator 3 as shown. The temperature-sensing means illustrated as bulb 5 serves to actuate a motor-controlling switch as will be explained more fully in connection with Fig. 2. A source of illumination, such as electric lamp 6, is mounted within the compartment immediately adjacent the bulb 5 so that heat generated by the lamp 6 when it is turned on is quickly radiated to bulb 5. The lamp 6 is energized through a door actuated switch 7 which is arranged to be closed when the door 2 is open and to be open when the door 2 is closed. The refrigerated compartment is adapted to be cooled in a well known manner by an electric motor driven compressor unit, not shown, connected through a condenser, not shown, to evaporator 3.

Turning now to Fig. 2, the combination illumination and temperature control system of our invention is shown more clearly by a schematic diagram. The electric lamp 6 and control bulb 5 are shown immediately adjacent each other as described for the actual mounting positions of Fig. 1. Control bulb 5 is connected by suitable tubing 8 to an expansible bellows 9, all of which are filled with a thermally expansible fluid such as any of those well-known in the art for use with temperature control bulbs and bellows. Upon the free or movable end of bellows 9, there is mounted a movable contact 10a which together with stationary contacts 10b and 10c forms an electrical switch 10, which is closed and opened as bellows 9 expands and contracts. Switch 10 is serially connected with a motor 11 and a source of electrical supply represented by supply conductors 12 and 13, and thus serves to start and stop motor 11 when bellows 9 expands and contracts in response to the temperature sensed by bulb 5. Motor 11 is provided as driving means of conventional condensing apparatus, not shown, such apparatus being well-known to those skilled in the refrigeration art.

Lamp 6 and door-actuated switch 7 in series are also connected with supply conductors 12 and 13. Switch 7 is illustrated as comprising a plunger 7a, a movable contact 7b, stationary contacts 7c and 7d, and a biasing spring 7e. Plunger 7a is adapted to be pushed to the right against the force of spring 7e when door 2 is closed, opening switch 7. When door 2 is opened spring 7e pushes movable contact 7b into engagement with contacts 7c and 7d, completing the circuit through the lamp 6 and illuminating the refrigerated compartment of the refrigerator.

In operation, our invention provides compensation minimizing fluctuations in refrigerated compartment temperature which would otherwise occur due to the compartment door being momentarily opened. At the instant door 2 is opened, switch 7 is closed by biasing spring 7e and lamp 6 is turned on to illuminate the refrigerated compartment. Heat, generated by the energized lamp 6 during the time that the door 2 is open, is directed to bulb 5, warming the fluid therein, causing the fluid and bellows 9 to expand substantially immediately after the door is opened and, thus, causing switch 10 to close and start motor 11. The heat generated by lamp 6 in this arrangement causes the compressor to be started sooner than if the bulb 5 were dependent solely upon evaporator temperature. Therefore, the compressor is driven to remove the heat, which entered the compartment and which was generated in the compartment by lamp 6 during the time that the door 2 was open, before such heat can appreciably warm the entire body of air and the objects in the compartment.

Since bulb 5 is preferably mounted on or near evaporator 3, the refrigerating action caused by the starting of motor 11 quickly cools the fluid in bulb 5 again after door 2 has been closed and lamp 6 turned off. When cooled sufficiently, the fluid in bulb 5 and the bellows 9 contract, opening switch 10 and stopping motor 11.

While the present invention has been described by reference to a particular embodiment thereof, it will be understood that modifications may be made by those skilled in the art without actually departing from the invention. We, therefore, aim in the appended claims to cover all such variations as come within the true spirit and scope of the foregoing disclosure.

What we claim as new and desire to secure by Letters Patent of the United States is:

1. In a refrigerator having a refrigerated compartment, a door for said compartment, an evaporator for cooling said compartment, and condensing apparatus for supplying refrigerant to said evaporator; a temperature and illumination control system comprising temperature-sensing means mounted adjacent said evaporator, a first switch actuated by said temperature-sensing means, said first switch controlling the operation of said condensing apparatus, a lamp mounted immediately adjacent said temperature-sensing means whereby heat from said lamp when illuminated is transferred directly to said temperature-sensing means and a second switch actuated by said door, said second switch deenergizing said lamp when said door is closed and energizing said lamp when said door is opened whereby heat is supplied directly from said lamp to said temperature-sensing means for actuating said first switch substantially immediately after said door is opened and without appreciably increasing the temperature of said refrigerated compartment.

2. A temperature and illumination control system for a refrigerator having a refrigerated compartment, a door for said compartment, and a compressor motor, said system comprising a first electric switch actuated by said door, an electric lamp for illuminating said compartment, a circuit including said first switch for deenergizing said lamp when said door is closed and for energizing said lamp when said door is open, a second electric switch, temperature-sensing means positioned immediately adjacent said lamp for controlling said second switch, heat being supplied directly from said lamp to said temperature-sensing means for actuating said second switch substantially immediately after said door is opened and without appreciably increasing the temperature in said refrigerated compartment, and a circuit including said second switch for energizing said motor.

3. In a refrigerator having a refrigerated compartment, a door for said compartment, and a compressor motor, a temperature and illumination control system comprising: a temperature-sensing control bulb in said compartment, an expansible bellows, and connecting tubing therebetween all containing thermally expansible fluid; a first electric switch; stationary contacts and movable contacts for said first switch; said movable contacts being actuated by said bellows; a circuit including said first switch for energizing said motor; a second electric switch actuated by said door; an electric lamp positioned immediately adjacent said control bulb for illuminating said compartment and directly heating said bulb; and a circuit including said second switch for deenergizing said lamp when said door is closed and for energizing said lamp when said door is open whereby heat is supplied directly from said lamp to said control bulb for expanding said bellows and closing said first switch substantially immediately after said door is opened and without appreciably increasing the temperature in said refrigerated compartment.

4. In a refrigerator having a refrigerated compartment, a door therefor, an evaporator for cooling said compartment, condensing apparatus for supplying refrigerant to said evaporator, and an electric motor for driving said condensing apparatus; a temperature and illumination control system comprising a first switch actuated by said door and arranged to be open when said door is closed and closed when said door is open, an electric lamp mounted in said compartment, said first switch and said lamp being connected in series, a temperature-sensing bulb mounted in said compartment immediately adjacent said lamp whereby heat from said lamp is transferred directly to said bulb when said lamp is illuminated, an expansible bellows, tubing connecting said bulb and said bellows, thermally expansible fluid in said bulb and said bellows and said tubing, and a second switch actuated by said bellows, said second switch including a stationary contact and a movable contact; said movable contact being actuated by said bellows to close said second switch when the temperature sensed by said bulb reaches a predetermined maximum, said second switch and said motor being connected in series, the heat generated by said lamp when said door is opened raising the temperature of said control bulb to said predetermined maximum substantially immediately after said door is opened and without appreciably increasing the temperature in said refrigerated compartment to provide temperature control compensation for said compartment.

FRANK A. SCHUMACHER.
JOHN B. TUCKER.

References Cited in the file of this patent

UNITED STATES PATENTS

| Number | Name | Date |
|---|---|---|
| 2,488,161 | Benson et al. | Nov. 15, 1949 |